United States Patent [19]
Yamaji et al.

[11] Patent Number: 6,116,283
[45] Date of Patent: Sep. 12, 2000

[54] FLUID CONTROL DEVICE

[75] Inventors: Michio Yamaji; Toshiro Nariai; Hiroshi Morokoshi, all of Osaka, Japan

[73] Assignee: Fujikin Incorporated, Osaka, Japan

[21] Appl. No.: 09/349,246

[22] Filed: Jul. 8, 1999

[30]     Foreign Application Priority Data

Jul. 10, 1998 [JP] Japan .................................. 10-195672

[51] Int. Cl.$^7$ .................................................. F16K 11/10
[52] U.S. Cl. .......................................... 137/884; 137/271
[58] Field of Search ................................... 137/884, 271, 137/613

[56]                 References Cited

U.S. PATENT DOCUMENTS

| | | | |
|---|---|---|---|
| 5,819,782 | 10/1998 | Itafuji ....................................... | 137/240 |
| 5,983,933 | 11/1999 | Ohmi et al. .............................. | 137/597 |
| 5,988,217 | 11/1999 | Ohmi et al. ........................... | 137/614.2 |

*Primary Examiner*—John Fox
*Attorney, Agent, or Firm*—Armstrong, Westerman, Hattori, McLeland & Naughton

[57]                 ABSTRACT

A fluid control device comprises a massflow controller having an inlet channel and an outlet channel, an inlet-side lower block coupling having a channel upwardly opened and communicating with the inlet channel of the massflow controller, an inlet-side connecting member adjacent to the inlet-side lower block coupling and having a channel opened upward, an inlet-side upper block coupling having an inverted V-shaped channel for holding the channel of the inlet-side lower block coupling in communication with the channel of the inlet-side connecting member, an outlet-side lower block coupling having a channel upwardly opened and communicating with the outlet channel of the massflow controller, an outlet-side connecting member adjacent to the outlet-side lower block coupling and having a channel opened upward, and an outlet-side upper block coupling having an inverted V-shaped channel for holding the channel of the outlet-side lower block coupling in communication with the channel of the outlet-side connecting member.

2 Claims, 3 Drawing Sheets

FLUID CONTROL DEVICE

BACKGROUND OF THE INVENTION

The present invention relates to fluid control devices, for example, for use in fabricating semiconductors, and more particularly to fluid control devices which comprise a massflow controller for controlling a flow rate and on-off valves or the like in combination therewith.

The terms "upper" and "lower" as used herein refer respectively to the upper and lower sides of FIG. 1. These terms are used for convenience' sake; the device may be used as turned upside down or as laid on its side.

Fluid control devices for use in fabricating semiconductors comprise the combination of a massflow controller for controlling a flow rate, pressure regulator or like controller, and on-off valves or the like. We have already proposed a fluid control device of this type having a preferred construction which comprises a massflow controller and on-off valves or like members which are connected to the controller by a plurality of block couplings (see Japanese Patent Application No. 278495/1997, and corresponding U.S. patent application Ser. No. 09/168,858).

FIG. 3 shows an example of such fluid control device. The terms "left" and "right" as used hereinafter refer respectively to the left-hand side and right-hand side of FIGS. 1 and 3.

With reference to FIG. 3, the fluid control device 31 comprises a rectangular parallelepipedal massflow controller 32 having a lower end portion formed with a leftwardly open inlet channel 32a and a rightwardly open outlet channel 32b, an inlet-side upper block coupling 33 having an inverted L-shaped channel 33a opened downward and in communication with the inlet channel 32a of the massflow controller 32, an inlet-side connecting member 34 adjacent to the coupling 33 at the left thereof and having an inverted L-shaped channel 34a opened downward, an inlet-side lower block coupling 35 having a V-shaped channel 35a for holding the channel 33a of the coupling 33 in communication with the channel 34a of the connecting member 34, an outlet-side upper block coupling 36 having an inverted L-shaped channel 36a opened downward and in communication with the outlet channel 32b of the massflow controller 32, an outlet-side connecting member 37 adjacent to the coupling 36 and having a flexed channel 37a opened downward, and an outlet-side lower block coupling 38 having a V-shaped channel 38a for holding the channel 36a of the coupling 36 in communication with the channel 37a of the connecting member 37.

The inlet-side connecting member 34 is a block coupling, and a first block valve 39 is disposed adjacent to the member 34 at the left thereof. The first block valve 39 comprises a rectangular parallelepipedal blocklike body 40 elongated leftward or rightward (i.e., longitudinally of the device 31) and having a main channel 40a in communication with the channel 34a of the connecting member 34, and a first actuator 41 and a second actuator 42 which are mounted on the top of the body 40. The body 40 has a left end portion joined to the right half of a lower block coupling 43 having a V-shaped channel 43a, and an intermediate portion joined to a lower block coupling 44 having an L-shaped channel 44a.

The outlet-side connecting member 37 is a rectangular parallelepipedal blocklike body of a second block valve 45. The valve 45 comprises the body 37 which is the outlet-side connecting member, and a third actuator 46 and a fourth actuator 47 which are mounted on the top of the body 37. The body 37 has a right end portion joined to an upper block coupling 48 having an inverted L-shaped channel 48a, and an intermediate portion joined to a block coupling 49 having an L-shaped channel 49a. The coupling 48 joined to the right end portion of the body 37 is joined to a lower block coupling 50 having an L-shaped channel 50a.

Although not shown, the lower block couplings 43, 44, 35, 38, 49, 50 are formed with through bores and screw bores at specified portions, and are fastened to a base plate P with bolts inserted through the respective through bores and screwed into screw bores in the base plate P. Different kinds of fluid controllers (first block valve 39, massflow controller 32 and second block valve 45) are each attached to two of these lower block couplings 43, 44, 35, 38, 49, 50 like a bridge. The inlet-side upper block coupling 33 and the outlet-side block coupling 36 fixed to the massflow controller 32 are fastened to the corresponding lower block couplings 35, 38, respectively, with screws 51 from above, whereby the controller 32 is removably mounted on the couplings 35, 38.

In the case where the fluid control device of the type described is attached to a wall in a clean room perpendicular thereto, the interior space of the room available diminishes correspondingly if the control device has a great height, presenting a problem from the viewpoint of economical use of space. Further it is disadvantageous to enlarge the clean room in corresponding relation with such fluid control devices not only in respect of the economical use of space but also from the viewpoint of savings in energy, so that it is strongly required to reduce the space needed for the installation of the devices. With the conventional fluid control device described, on the other hand, the overall height of the device is dependent on the upper end of the massflow controller which is positioned at the highest level. This entails the problem that it is difficult to reduce the installation space.

SUMMARY OF THE INVENTION

An object of the present invention is to provide a fluid control device which can be diminished in the space required for installation.

The present invention provides a fluid control device comprising a massflow controller having a laterally opened inlet channel and an outlet channel opened in an opposite direction to the inlet channel, an inlet-side lower block coupling having a channel upwardly opened and communicating with the inlet channel of the massflow controller, an inlet-side connecting member adjacent to the inlet-side lower block coupling and having a channel opened upward, an inlet-side upper block coupling having an inverted V-shaped channel for holding the channel of the inlet-side lower block coupling in communication with the channel of the inlet-side connecting member, an outlet-side lower block coupling having a channel upwardly opened and communicating with the outlet channel of the massflow controller, an outlet-side connecting member adjacent to the outlet-side lower block coupling and having a channel opened upward, and an outlet-side upper block coupling having an inverted V-shaped channel for holding the channel of the outlet-side lower block coupling in communication with the channel of the outlet-side connecting member.

The connecting member is, for example, the body of an on-off valve, the body of a block valve comprising a plurality of monofunctional members, or a block coupling. The block coupling comprises a rectangular parallelepipedal block formed with a required fluid channel. The upwardly opened channel is usually L-shaped and opened rightward or leftward at the other end.

With the fluid control device of the present invention, the lower block coupling and the connecting member which are arranged at each of the inlet side and the outlet side of the massflow controller are joined by the upper block coupling mounted on the upper surfaces of these coupling and member. This arrangement obviates the need to provide a coupling beneath the bottom of the massflow controller, with the result that the massflow controller can be smaller in height than conventionally relative to the base plate. The installation space for the fluid control device can therefore be reduced.

DESCRIPTION OF THE PREFERRED EMBODIMENT

An embodiment of the present invention will be described below with reference to the drawings.

Figure 1:
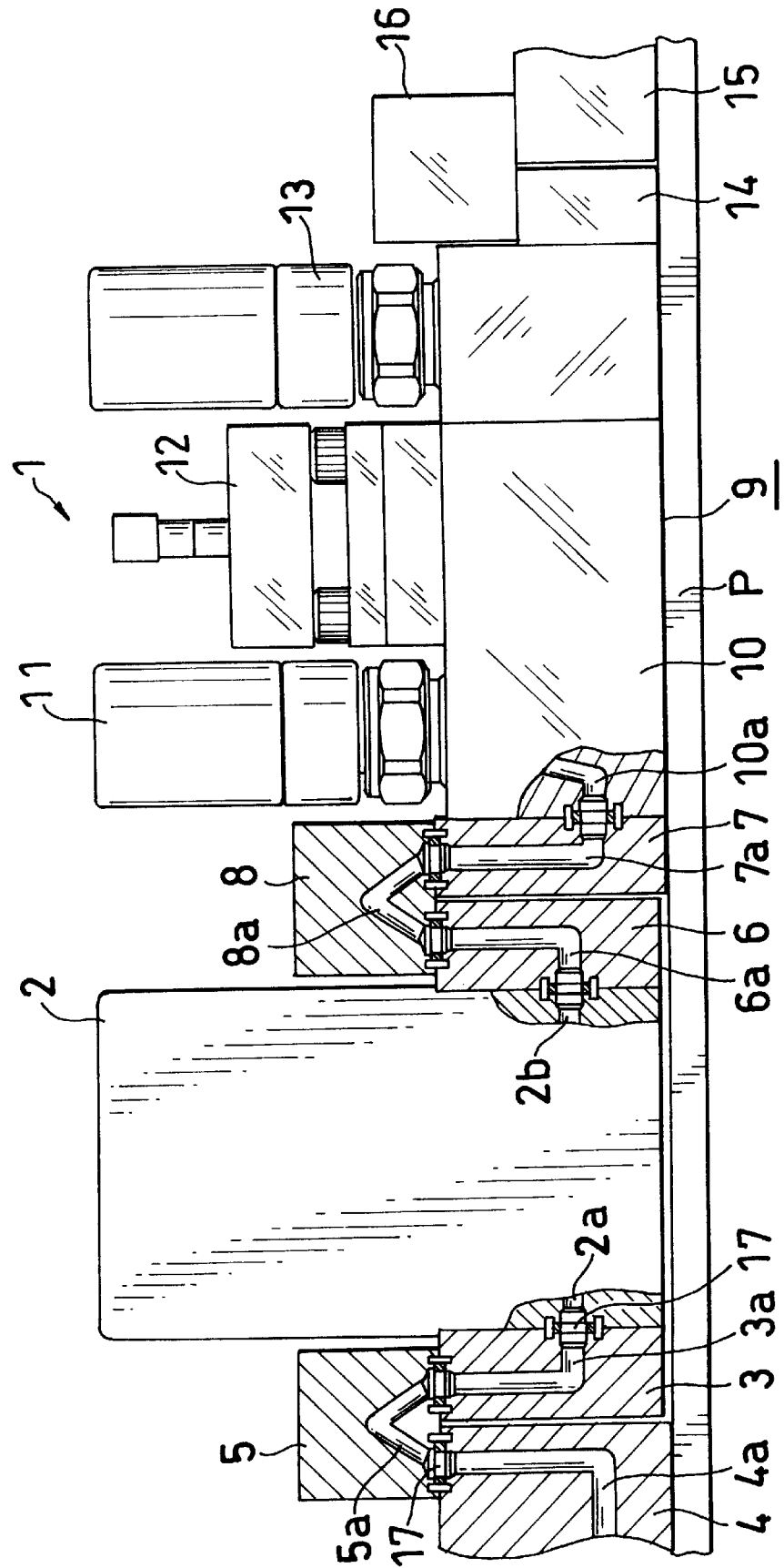
FIG. 1 is a front view showing a fluid control device embodying the invention.
Figure 2:
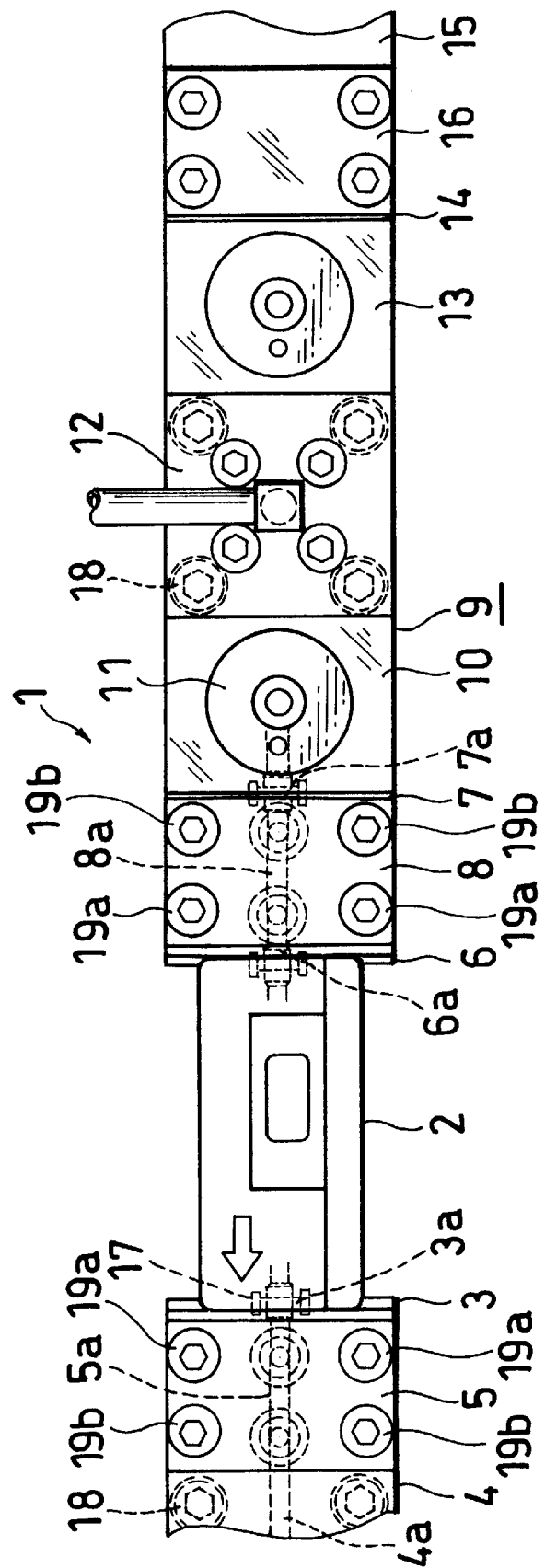
FIG. 2 is a plan view of the same.

FIGS. 1 and 2 show a fluid control device 1 of the invention which comprises a rectangular parallelepipedal massflow controller 2 having a lower portion formed with a leftwardly opened inlet channel 2a and a rightwardly opened outlet channel 2b, an inlet-side lower block coupling 3 having an L-shaped channel 3a upwardly opened and communicating with the inlet channel 2a of the massflow controller 2, an inlet-side connecting member 4 adjacent to the coupling 3 and having an L-shaped channel 4a opened upward, an inlet-side upper block coupling 5 having an inverted V-shaped channel 5a for holding the channel 3a of the coupling 3 in communication with the channel 4a of the connecting member 4, an outlet-side lower block coupling 6 having an L-shaped channel 6a upwardly opened and communicating with the outlet channel 2b of the massflow controller 2, an outlet-side connecting member 7 adjacent to the coupling 6 and having an L-shaped channel 7a opened upward, and an outlet-side upper block coupling 8 having an inverted V-shaped channel 8a for holding the channel 6a of the coupling 6 in communication with the channel 7a of the connecting member 7.

The outlet-side connecting member 7 is a block coupling, and a block valve 9 is disposed adjacent to the connecting member 7 at the right thereof. The block valve 9 comprises a blocklike body 10 having an inlet channel 10a in communication with the channel 7a of the connecting member 7, and an on-off valve 11 and a check valve 12 which are mounted on the body 10. An on-off valve 13 is disposed at the right of the block valve 9 adjacent thereto and has a body, at the right of which are arranged left and right lower block couplings 14, 15 joined by an upper block coupling 16. A seal member 17 is disposed at the joint of each pair of butting members.

The inlet-side and outlet-side lower block couplings 3, 6 are fastened to the massflow controller 2 with lateral screws (not shown). The outlet-side connecting member 7 is fastened to the block valve body 10 with lateral screws (not shown). As shown in FIG. 2, the inlet-side connecting member 4 and the block valve body 10 are fastened to a base plate P with screws 18 screwed in from above. The inlet-side upper block coupling 5 is fastened to the corresponding lower block coupling 3 and the inlet-side connecting member 4 with right and left two pairs of screws 19a, 19b screwed in from above, and the outlet-side upper block coupling 8 to the corresponding lower block coupling 6 and the outlet-side connecting member 7 with left and right two pairs of screws 19a, 19b screwed in from above. Accordingly, the massflow controller 2 can be removed upward together with the lower block couplings 3, 6 and the upper block couplings 5, 8 by removing the left pair of screws 19b fastening the coupling 5 to the inlet-side connecting member 4 and the right pair of screws 19b fastening the coupling 8 to the outlet-side connecting member 7. Further the massflow controller 2 can be removed upward along with the lower block couplings 3, 6 by removing all the screws 19a, 19b fixing the upper block couplings 5, 8. In this case, the upper block couplings 5, 8 are removable.

Figure 3:
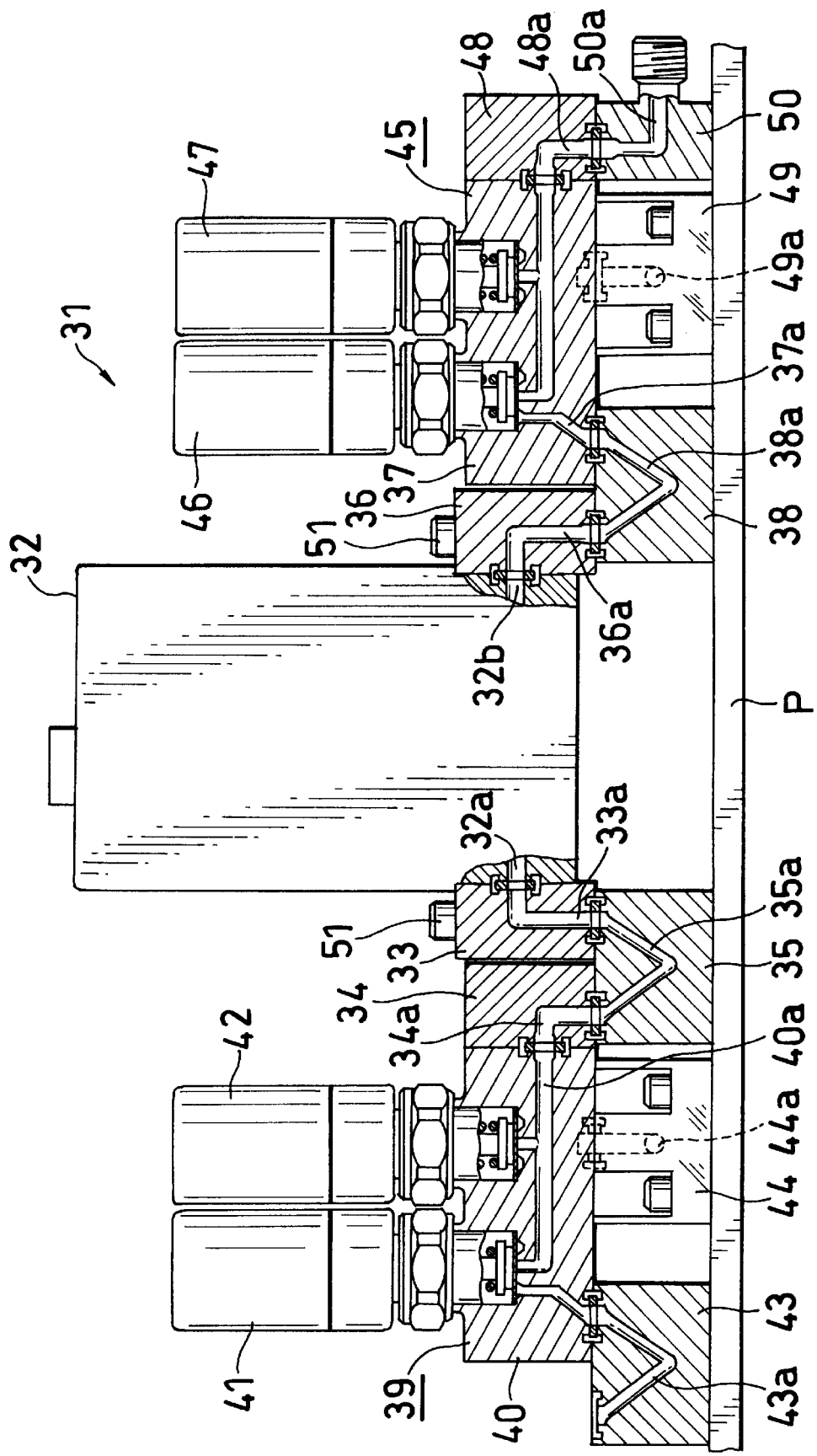
FIG. 3 is a front view showing a conventional fluid control device.

With the fluid control device 1 described, almost no clearance is left between the bottom of the massflow controller 2 and the base plate P, and all the fluid controllers (massflow controller 2, block valve 9 and on-off valve 13) have approximately the same height relative to the base plate P as shown in FIG. 1. With the conventional fluid control device 31 shown in FIG. 3, on the other hand, there is a clearance corresponding approximately to the height of the lower block couplings 35, 38 between the bottom of the massflow controller 32 and the base plate P, with the result that the controller 32 projects upward beyond the other fluid controllers (first block valve 39 and second block valve 45). The position of the upper end of the massflow controller 32 determines the overall height of the device 31. Consequently, the fluid control device 1 shown in FIG. 1 is smaller than the conventional device 31 shown in FIG. 3 in the space required for installation by an amount corresponding approximately to the height of the lower block couplings 35, 38.

Incidentally, the fluid control device 1 includes the block valve 9 which comprises different valves (on-off valve and check valve) mounted on the blocklike body 10 as a unit. This reduces the number of components such as valve bodies and seal members.

What is claimed is:

1. A fluid control device comprising a massflow controller having a laterally opened inlet channel and an outlet channel opened in an opposite direction to the inlet channel, an inlet-side lower block coupling having a channel upwardly opened and communicating with the inlet channel of the massflow controller, an inlet-side connecting member adjacent to the inlet-side lower block coupling and having a channel opened upward, an inlet-side upper block coupling having an inverted V-shaped channel for holding the channel of the inlet-side lower block coupling in communication with the channel of the inlet-side connecting member, an outlet-side lower block coupling having a channel upwardly opened and communicating with the outlet channel of the massflow controller, an outlet-side connecting member adjacent to the outlet-side lower block coupling and having a channel opened upward, and an outlet-side upper block coupling having an inverted V-shaped channel for holding the channel of the outlet-side lower block coupling in communication with the channel of the outlet-side connecting member.

2. A fluid control device according to claim 1 wherein the inlet-side and outlet-side lower block couplings are fastened to the massflow controller with lateral screws, the outlet-side connecting member being fastened to a block valve body with lateral screws, the inlet-side connecting member and the block valve body being fastened to a base plate with screws screwed in from above, the inlet-side upper block coupling being fastened to the corresponding lower block coupling and the inlet-side connecting member with screws screwed in from above, the outlet-side upper block coupling being fastened to the corresponding lower block coupling and the outlet-side connecting member with screws screwed in from above.

* * * * *